(12) United States Patent
Bouquet

(10) Patent No.: US 6,643,746 B1
(45) Date of Patent: Nov. 4, 2003

(54) OPTIMAL MULTI-CHANNEL MEMORY CONTROLLER SYSTEM

(75) Inventor: Christophe Bouquet, Singapore (SG)

(73) Assignee: Creative Technology Ltd., Creative Resource (SG)

(*) Notice: Subject to any disclaimer, the term of this patent is extended or adjusted under 35 U.S.C. 154(b) by 0 days.

(21) Appl. No.: 09/582,575

(22) PCT Filed: Dec. 23, 1998

(86) PCT No.: PCT/IB98/02138

§ 371 (c)(1),
(2), (4) Date: Jun. 22, 2000

(87) PCT Pub. No.: WO99/34294

PCT Pub. Date: Jul. 8, 1999

Related U.S. Application Data

(60) Provisional application No. 60/068,839, filed on Dec. 24, 1997.

(51) Int. Cl.[7] ............................................. G06F 13/18
(52) U.S. Cl. ...................................................... 711/151
(58) Field of Search ............................ 711/5, 150, 151, 711/158

(56) References Cited

U.S. PATENT DOCUMENTS

| | | | | |
|---|---|---|---|---|
| 5,142,638 A | | 8/1992 | Schiffleger | ............... 395/425 |
| 5,182,801 A | | 1/1993 | Asfour | ................ 395/425 |
| 5,559,970 A | * | 9/1996 | Sharma | ................ 395/312 |
| 5,590,304 A | * | 12/1996 | Adkisson | ............... 395/427 |
| 5,761,455 A | * | 6/1998 | King et al. | ............. 395/307 |
| 5,930,822 A | * | 7/1999 | Chaney et al. | .......... 711/150 |

FOREIGN PATENT DOCUMENTS

| | | |
|---|---|---|
| WO | WO 95/15528 | 11/1994 |
| WO | WO 97/06523 | 8/1996 |
| WO | WO 97/26604 | 1/1997 |

* cited by examiner

*Primary Examiner*—Kevin L. Ellis
(74) *Attorney, Agent, or Firm*—Blakely, Sokoloff, Taylor & Zafman LLP

(57) ABSTRACT

A unified memory architecture system using multiple physical memory channels. While modern memory systems offer compact bus interfaces, thus reducing the amount of required I/O ports for each memory bus, a unified memory architecture system is provided which allows a physical system-on-chip to be built using more than one physical memory channel. The unified memory architecture system is supported while also providing a multi-channel memory system that can take advantage of the multi-channel memory bandwidth to provide increased speed for an application. A performance/coast tradeoff can be adjusted dynamically by an end user application. 3-Drenderings can be accomplished with the invention where performance may be optimized. While taking advantage of the multi-channel memory bandwidth for traditional graphics buffers.

30 Claims, 7 Drawing Sheets

OPTIMAL MULTI-CHANNEL MEMORY CONTROLLER SYSTEM

This application claims the benefit of Provisional application Ser. No. 60/068,839, filed Dec. 24, 1997.

BACKGROUND OF THE INVENTION

This invention relates generally to the field of uniform memory access systems, more particularly to the area of multi-channel memory access systems.

In the past, computer systems have utilized an arrangement where a multiple number of requestors accessed a memory through a single memory channel. As a result of these multiple requesters needing to access the memory system through a single memory channel, the speed of the process being run by the computer has not been optimal. Therefore, there is a desire for a memory system that will allow a multiple number of requesters to access the memory system simultaneously.

For example, in the area of computer graphics, application programs often utilize several buffers in the application program. Each of these buffers, e.g., a local buffer, a frame buffer, and a texture buffer are required to perform a graphics routine. Each of these buffers is designated a location in the memory system. However, in prior systems, an application could only access each buffer one at a time. To enhance the performance of the graphics application program, it would be desirable if a memory system existed that would allow both or all three buffers to be accessed simultaneously. While one can envision that each buffer could be stored in a separate memory system dedicated to that particular buffer, it would be desirable if an application that normally deals with one buffer could also access different buffers. Therefore, it is desirable that a unified memory system to be able to access each individual buffer should that be necessary.

In traditional approaches, multi-channel memory systems have typically not provided for unified memory architecture. In fact, application programs have been expected to split the logical buffers of the application physically over the different memory channels of the memory system. This reduces greatly the functionality of the system and may yield to subsequent degradation of the memory performance if transfers within logical buffers are required. The physical size of each memory channel also fixes the size of the logical buffers and their granularity. A system requiring a large logical buffer, or a logical buffer with uncommon granularity, may thus end up wasting a large amount of physical memory.

In the past, memory systems requiring support for unified memory architecture typically have made use of a single memory channel. However, the bandwidth of a single channel memory system can be considered to be approximately N times less than that of an N channel memory system (for a given data bus width).

While an alternative solution to multi-channels might be to increase the memory data bus width, this implies that accesses to memory are essentially sequential and contiguous, which is not the case in most applications with multiple request sources.

Therefore, current memory systems can be classified into two categories. The first is a single channel unified memory system, with a low bandwidth for a large pin count. The second is a multi-channel non-unified memory system that is functionally limited. Therefore, there is a desire for a flexible solution to this problem whereby an application can dynamically make use of multiple channels while keeping a fully unified memory architecture system.

SUMMARY OF THE INVENTION

The present invention provides a circuit for use in a Unified Memory Architecture system, the circuit comprising a memory of the Unified Memory Architecture system; a plurality of requesting devices; a plurality of channel selectors capable of receiving a command from at least one of said plurality of requesting devices for the Unified Memory Architecture system; a first memory channel coupled to each of said channel selectors that can provide access to a first area of address space of the memory; and at least one additional memory channel coupled to each of said channel selectors, the or each additional memory channel being capable of providing access to an additional address space of said memory, wherein the circuit is characterized by an arbiter capable of passing said command to a memory controller with a selector-tag for use when said command is a read request to identify the channel selector that routed the command to the memory channel; and wherein said arbiter, memory controller and memory channel used to pass said command are responsible for and capable of transmitting data both to and from said memory. Similarly, a method of operating the circuit is also provided by the invention.

The invention is advantageous in that a Universal Memory Architecture System can be implemented while allowing a plurality of requesters to access the Universal Memory Architecture System. In this manner, the speed of the memory system is enhanced, because the various requesters can access different areas of the memory simultaneously rather than serially. In addition, application programs running on processors of the requesters can optimize their performance by reallocating buffers used by the application program to different memory channels. In this fashion, the information of the buffers can be accessed simultaneously and the speed of the application program can be increased.

It is to be understood that the invention is not limited to the details disclosed but includes all such variations and modifications as fall within the spirit of the invention and the scope of the appended claims.

DETAILED DESCRIPTION OF THE PREFERRED EMBODIMENT

Figure 1:
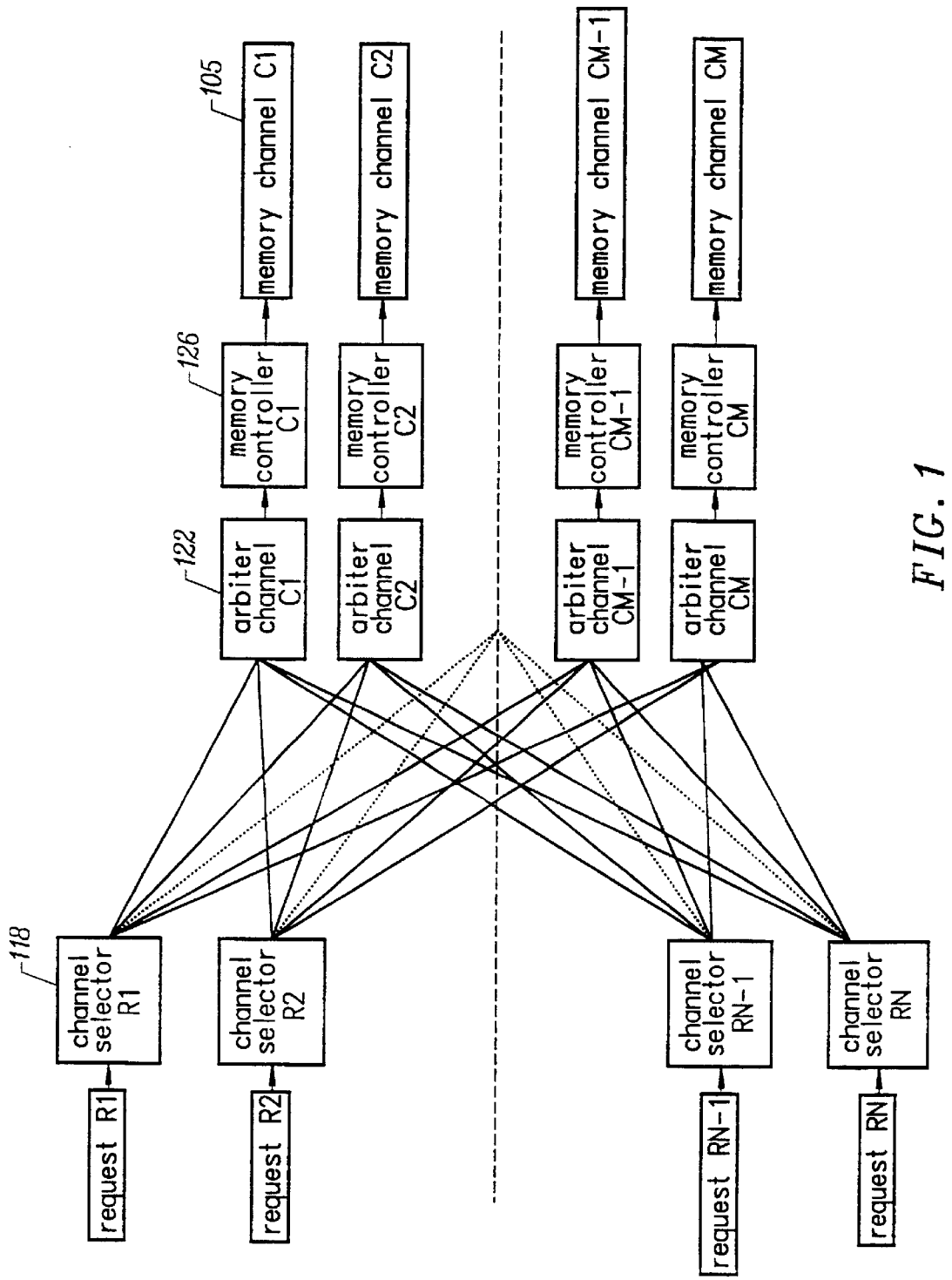
FIG. 1 is a block diagram presenting the funeral architecture of the invention.
Figure 2:
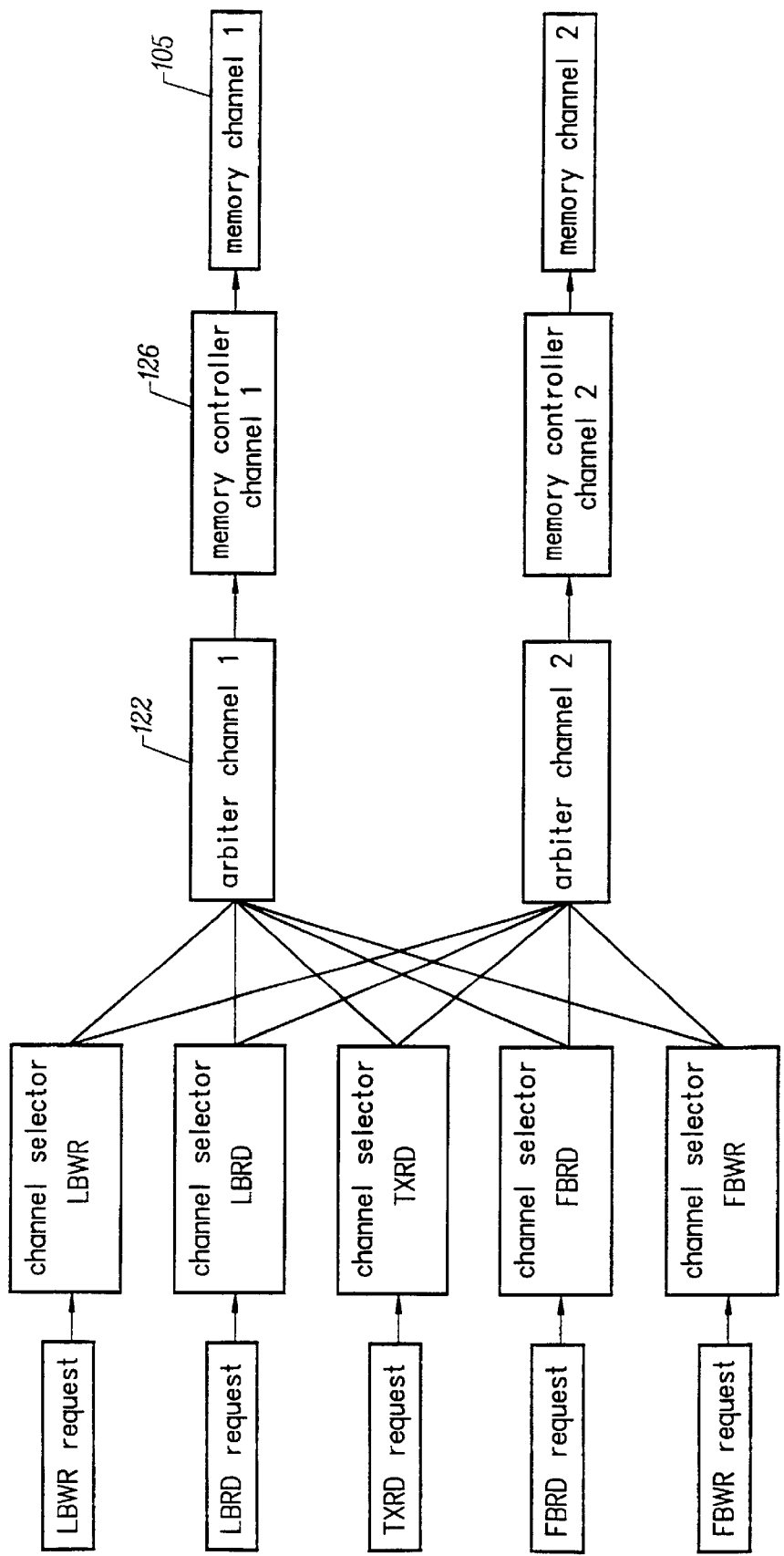
FIG. 2 shows a block diagram of a 3-D rendering engine utilizing the invention.

Referring now to the drawings, and more particularly to FIG. 1, there is shown a multi-channel unified memory architecture system which comprises one embodiment of the present invention. FIG. 1 shows several requests being linked to a memory of the unified memory architecture system. As can be seen in FIG. 1, the requests are interfaced with channel selectors (118). The channel selector is coupled to different arbiters (122) which in turn are coupled to memory controllers (126). The memory controllers are coupled to the individual memory channels (105) which permit access to the physical address space of the memory itself.

Figure 6:
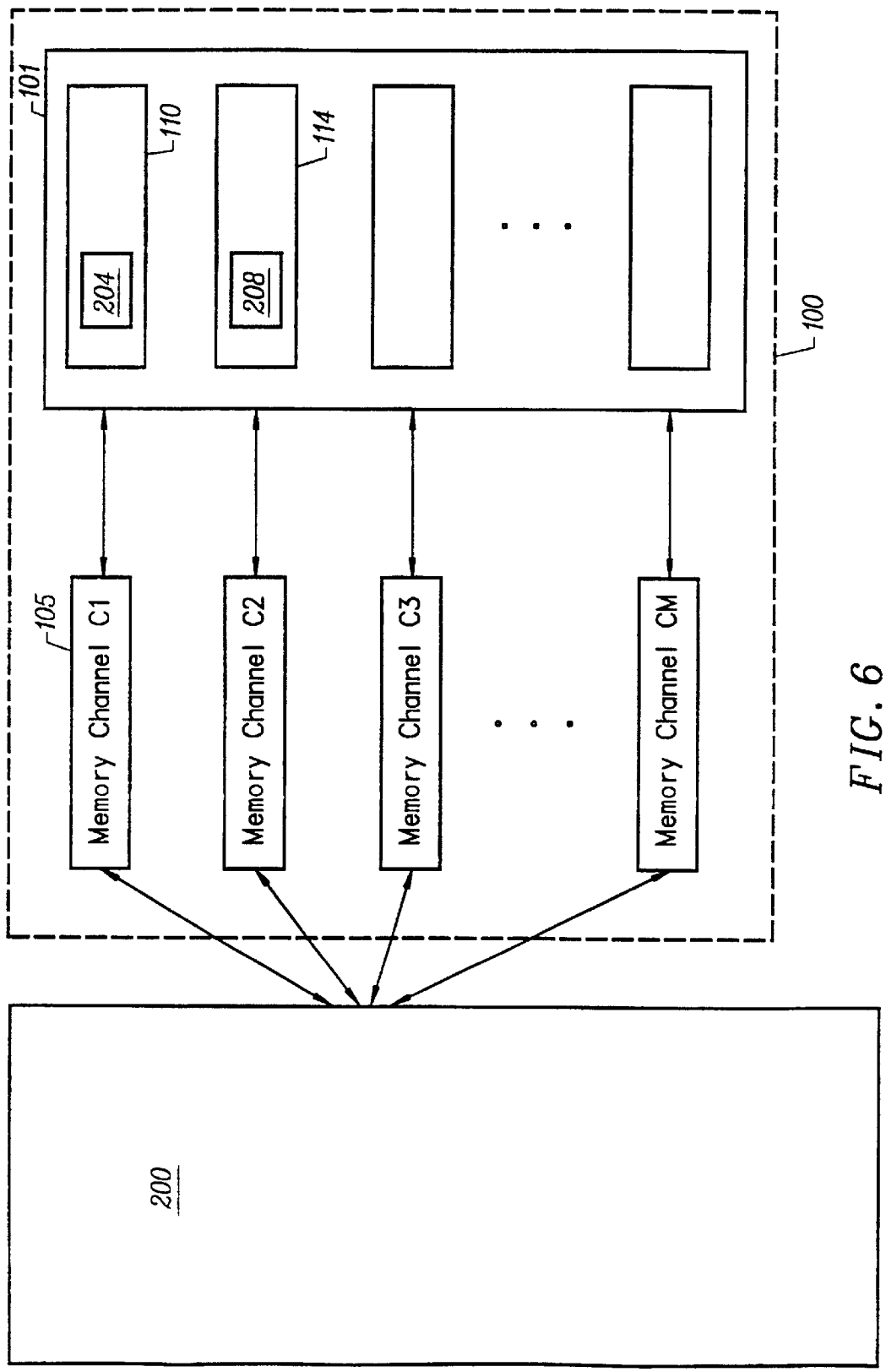
FIG. 6 shows a general overview of an application program coupled to a universal memory architecture system.
Figure 7:
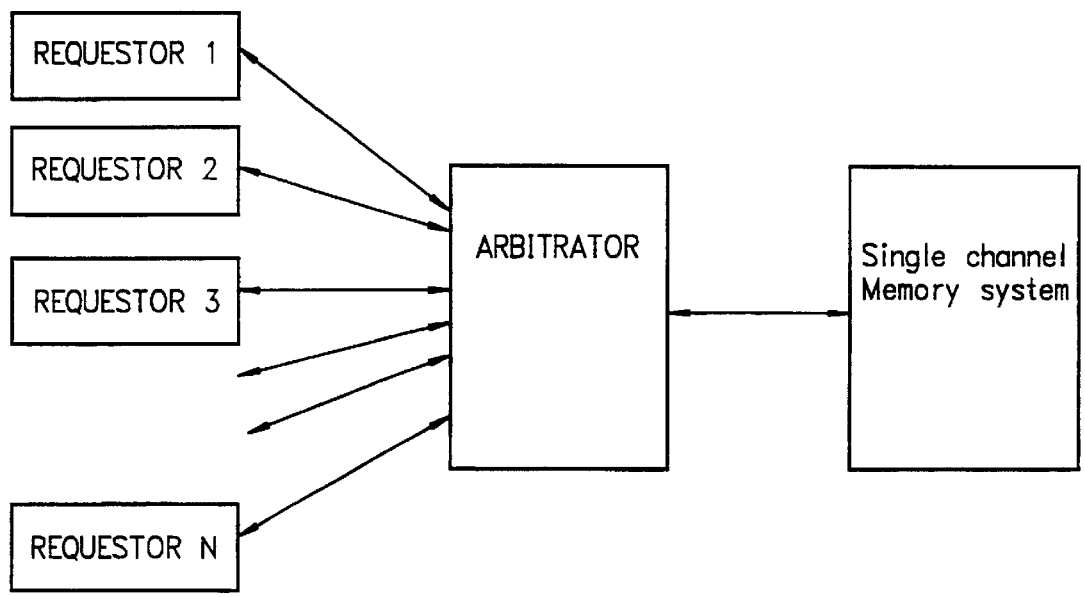
FIG. 7 shows an existing unified memory architecture system that utilizes a single memory channel.

As can be seen in FIG. 6, an application (200) can access memory (101) via the memory channel (105). By providing a memory of the unified memory architecture system, a first area of address space (110) can be provided through a first memory channel C1 as shown in FIG. 6. In addition, additional areas of address space (114) can be provided such as memory channels C2, C3, CM, as shown in FIG. 6. The unified memory architecture system (100) allows the first memory channel of the memory of the unified memory architecture system to provide access to the first area of address space of the memory and also provides at least one additional memory channel of the memory of the unified memory architecture system such as C2, C3, and CM to permit each respective memory channel to provide access to additional address spaces of the memory. It should be understood that a unified memory architecture system is intended to mean a memory system that allows a plurality of requests to be made to the memory space of the memory and which allows each requestor to access any region of that memory space.

In FIG. 1 a channel selector arrangement can be seen. The channel selectors can receive requests from individual requestors and route those requests to the proper memory channel. As shown in FIG. 1 each request can be coupled directly to its respective channel selector. The channel selector (118) can then decode the request such as a read or write command and route that request to the memory channel which provides access to the address space required by the command. FIG. 1 shows several channel selectors, with each channel selector being capable of receiving a command for the unified memory architecture system and also capable of routing commands to the requested memory channel of the unified memory architecture system. It should be understood that routing of a command does not necessarily mean a direct connection to a memory channel as other circuit elements may be required to interface the command to the memory channel.

However, routing is envisioned to mean that the received request is indirectly coupled to the memory channel. In addition, it should be understood that the use of the word "requested memory channel" is intended to mean the memory channel needed by a received command. For example, if a write command is received by a selector, the requested memory channel would be the memory channel which permits access to the area of memory where data is to be written to.

In FIG. 1, each of the different selectors can be seen to be coupled, e.g., electrically coupled, to several different arbiter channels C1, C2, CM-1, CM (122). Each arbiter can be associated with a memory channel. For example, arbiter channel C1 is associated with memory controller and memory channel C1 in FIG. 1. Similarly, arbiter channel CM is associated with memory controller CM. The arbiters are capable of prioritizing many different commands intended for a memory channel. For example, the arbiter for memory channel C1 in FIG. 1 is capable of prioritizing several different commands intended for that channel. The arbiters can serialize the several different commands that they receive. The arbiters are also capable of passing a command to a memory controller with a selector tag to identify the channel selector that routed the command to the memory channel. In this way, when the arbiter receives back from the memory controller a read request, for example, the arbiter can identify which selector it should pass the read information to.

Figure 5:
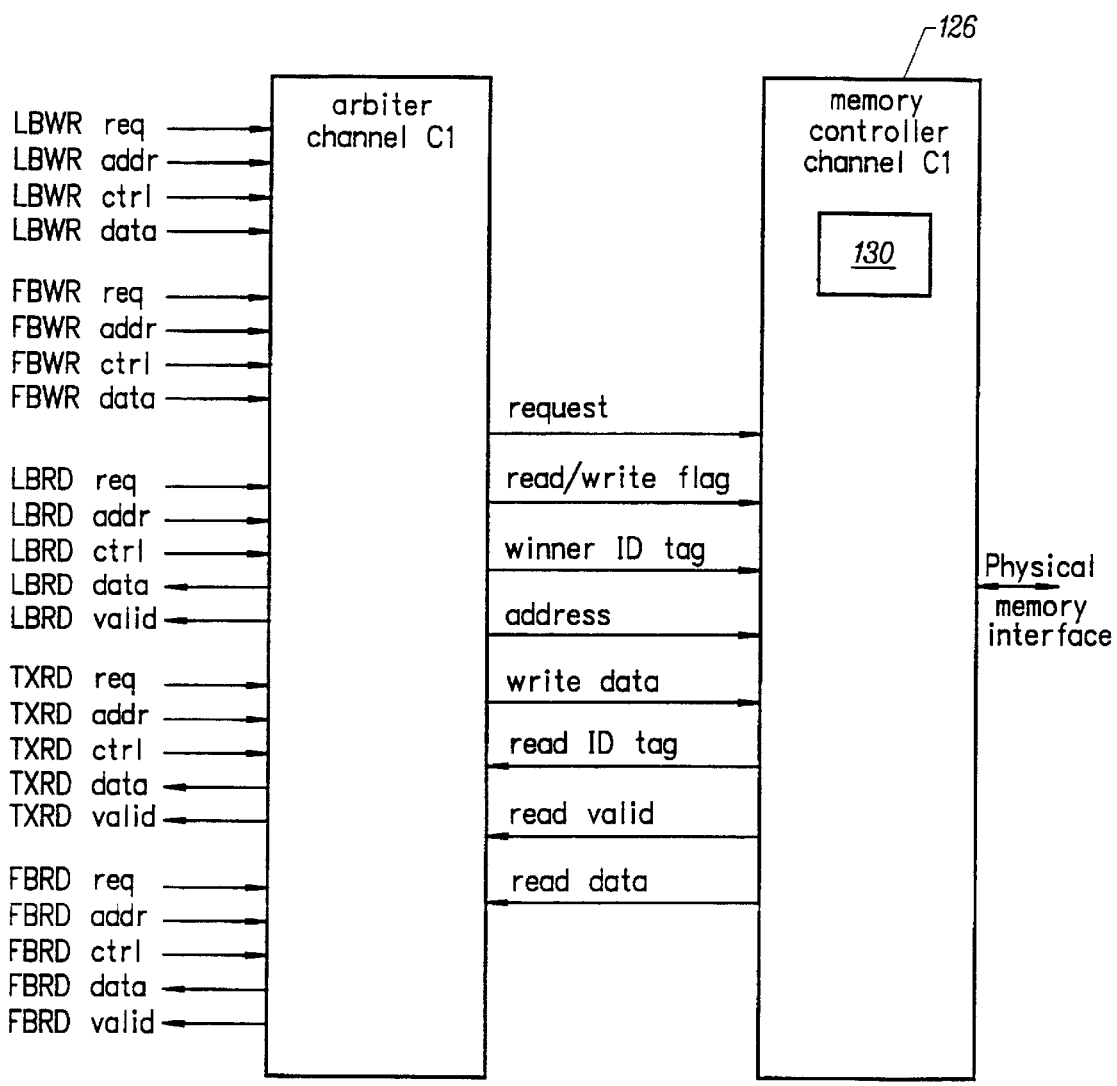
FIG. 5 shows a possible interfacing connection to provide proper operation of each of the channel arbiters and memory controllers for a 3-D rendering engine with two physical memory channels.

The arbiters are coupled to individual memory controllers 126 as shown in FIG. 1. Each memory controller can be associated with its own respective memory channel (105). The memory controller can be capable of configuring the command into a proper format for the specific type of memory being used in the system. A memory controller can utilize a memory controller buffer (130) as shown in FIG. 5. The memory controller buffer can store the selector tag that identifies that channel selector that routed the command to the memory channel.

One embodiment of the invention can be visualized in the following scenario. Assume that an application (200) requires a unified memory architecture scheme such that each requester to the memory needs access to the entire memory (101), not just to a specific block of memory. Then assume that M physical memory channels for N request sources are being utilized. Also assume that each requestor will primarily, but not solely, require access to a single memory channel. Each requester may also require access to other memory channels at any given time, and a path can be provided to fully support this feature. A request might be a memory read or a memory write access, for example. In the case of a memory write, data may flow from the system to the memory. No further path will typically be required. For memory reads, the read address and control will be flowing from the system to the memory. However, a return path will typically be needed for the read data. This may require two different architectures for the selectors, which may be issuing read or write requests. In any case, data coherency and ordering must be ensured. As shown in FIG. 1, the circuit arrangement of the different blocks is such that each selector can interface to all the memory arbiters. Each memory arbiter in its turn can interface with a unique memory controller, which can physically connect to a single memory channel. This network between all the selectors and all the arbiters can provide for requests to access any of the channels, thus implementing a fully unified memory architecture system. Should unified memory architecture only be partially supported, some of these connecting paths may be removed to give a simpler and more cost effective implementation.

Figure 3:
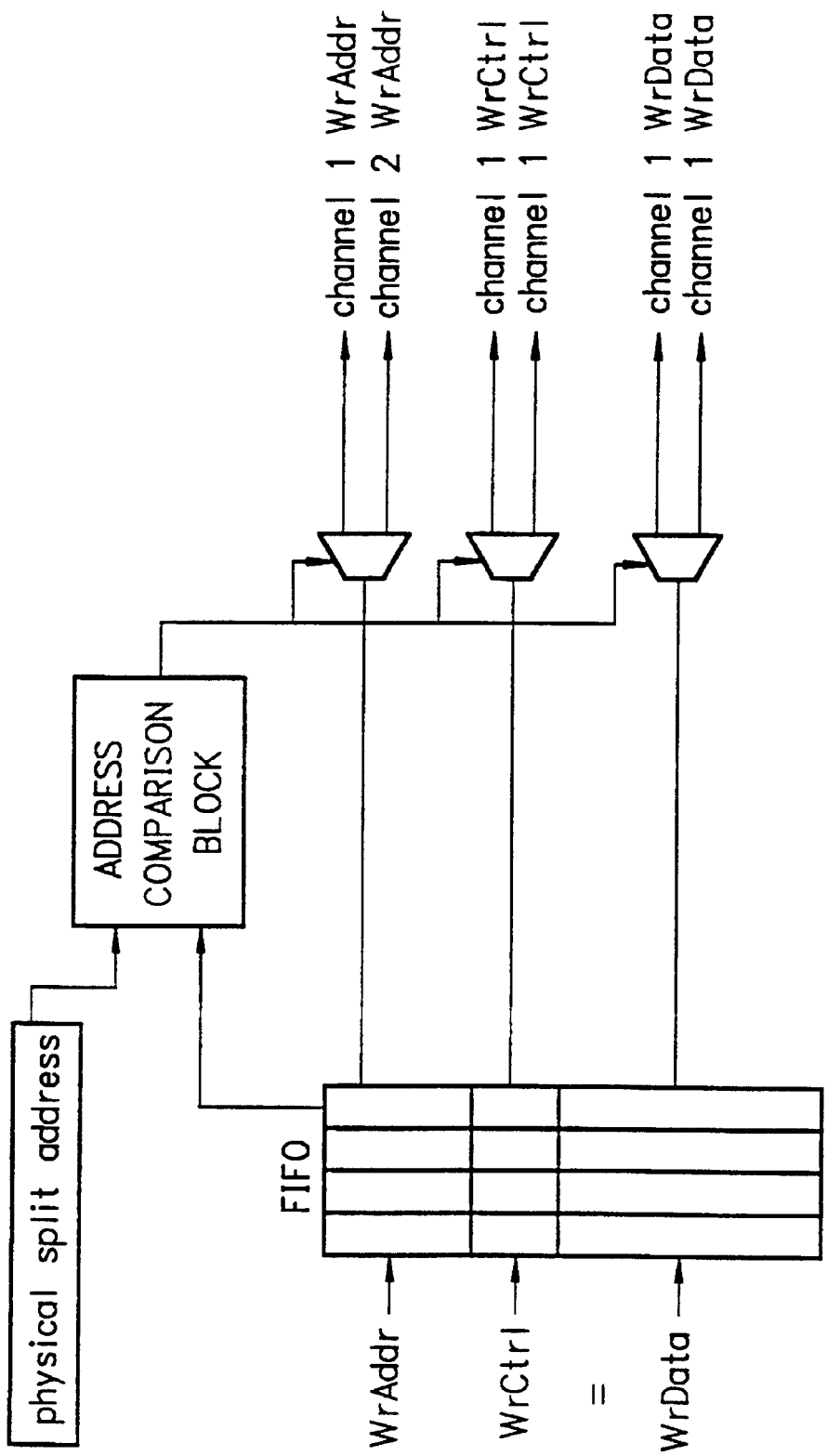
FIG. 3 shows the internal logic of a selector for a write request block in a 3-D rendering engine application, assuming two physical memory channels.

Because all the requestors can run and may issue requests at any time, the system can be considered synchronous to a single clock. A requestor might only assert one request at a time. Once this request is generated, it can be routed to its individual request selector. The request selector can hold an address table containing all the physical addresses of the memory channel boundaries. By simply comparing the incoming request address to each of the channel boundary addresses, the selector can determine to which channel the request is addressed. Since the mapping of the different channels is non-overlapping and continuous, one channel will be addressed by each request. FIG. 3 shows an example of a write selector with two memory channels. An actual implementation will typically make use of a request FIFO, where the last stage of the FIFO can be used for address comparison. This can lead to a fully pipelined, one-clock throughput design.

Once the selector decodes the memory channel, it can forward the request to the appropriate arbiter, together with the request address, control, and data in the case of a write access. The arbiter can determine which request should be served according to a predetermined algorithm. Since all memory channels will be physically separated, they will be independent, and the different arbiters can operate concurrently. An arbiter may potentially serialize the different requests if more than one request is received for a given channel. However, if the requests are asserted to different arbiters, all the requests may be served concurrently, taking full advantage of the multi-channel memory system bandwidth.

The arbiter may signal back to a selector that a request has been served, and pass the winning request to its memory controller with a tag indicating the origin of the request. This tag can be propagated along with the request through the memory controller to identify the path to be taken by data that is returned, for example, in the case of a memory read. For memory writes, the tag may be collapsed as it will typically not be used later on. For memory reads, the memory controller can buffer the read tag and send it back to the arbiter along with the read data once it is received from the memory. Upon receiving the returned data, the arbiter can pass the information back to the appropriate selector according to the request tag.

Figure 4:
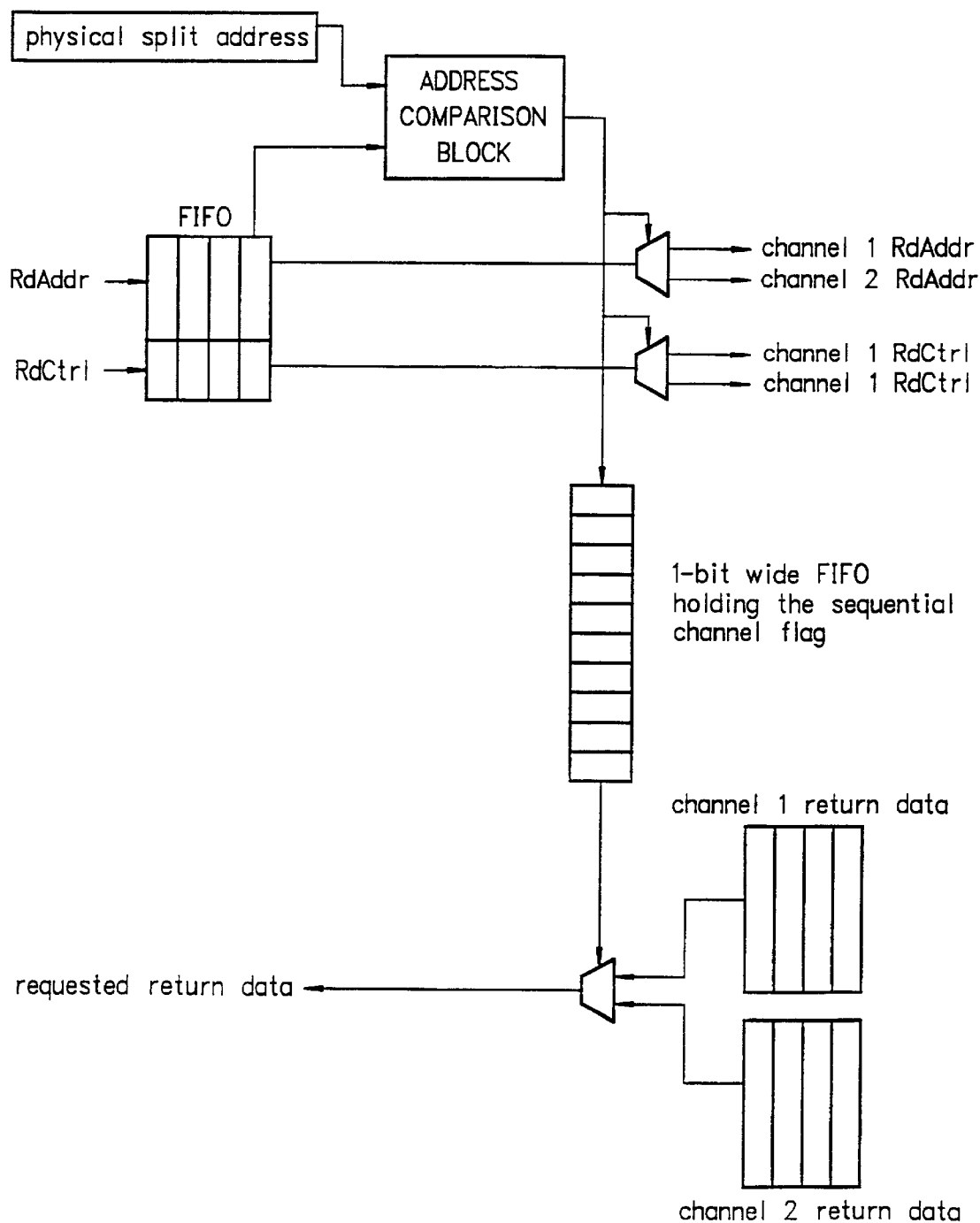
FIG. 4 shows the internal logic of a selector for a read request block in a 3-D rendering engine application, together with its return data path, assuming two physical memory channels.

A read request selector example is shown in FIG. 4 for a two-channel memory system. A potential problem with a multi-channel memory system resides in the possible different latencies of the multiple channels. As such, the same requester might issue two read requests A, then B, to two different channels, and have read request B served before read request A. In order to ensure data ordering, each read selector can store in a FIFO a tag identifying the channel being accessed. As the reads are received from the different channels, and knowing that each channel keeps data coherency, the receiving part of the selector can accept the proper data accordingly, and refuse return data from other channels until the correct channel identification tag is present. At this point in time, the read data is available and can be returned to the requestor in order. FIG. 4 presents an application example using two memory channels, where the channel identification FIFO is reduced to a 1-bit wide FIFO.

Additional control logic may be added to the architecture to prevent potential Read-Before-Write or Write-Before-Read problems. Such problems may occur when read and write requestors both attempt an access to the same memory location. Depending on the arbiter algorithm, any of the requests may be served first. In a typical system, the application program will typically prevent this kind of event from happening. However, if there is a need for securing these transactions, such a situation can be detected by the channel arbiter which can stall the appropriate requestor according to the functional needs of the application.

Another functionally awkward situation might occur when different requesters of the same type try to access the same memory location. This is important in the case of a write-before-write process. Here again, a solution can be implemented at the application level, but also can be secured locally. Each arbiter can do simple address analysis preventing two different write requesters from accessing the same resource and blocking the resource for a particular requestor according to functional specifications.

Another embodiment of the invention allows it to accomplish a dynamic reallocation of address space during the run time of an application. This allows the efficiency of the application to be optimized. As shown in FIG. 6, an application (200) can be interfaced with a unified memory architecture system (100) and memory channels (105) can be utilized to access individual areas of address space (110) and (114) of memory (101). The application itself can allocate a first buffer of information of the application to a first memory channel so as to allow that first buffer of information to be stored in the area of address space that is accessed through that particular memory channel. Furthermore, a second memory channel (C2) can be coupled between the application and the memory (101). Then, while the application is running, the allocation of the first buffer of information can be revised such that at least a portion of that first buffer of information is re-allocated to the additional memory channel (C2) or to more than one additional memory channel.

In another embodiment of the invention, a second buffer of information of the application can be allocated to the memory of the unified memory architecture system so as to allow the second buffer of information to be stored in the memory. In this embodiment, the first buffer and the second buffer can be re-allocated to the memory during the run time of the application so as to alter the speed of the application. A means for re-allocating, such as a software routine that assigns buffers to different areas of address space in a simple look-up table can be used. The re-allocation of the first buffer and the second buffer to different areas of the memory can be utilized to increase the speed of the application.

In another embodiment of the invention, the first memory channel can be utilized to access the first area of address space of the memory while at least one additional memory channel can concurrently be utilized to access at least one additional area of address space of the memory. In addition, additional memory channels might be utilized to address still more areas of address space of the memory.

In another scenario, in addition to the first buffer of information being stored in the memory, a second memory channel can be provided to allow a second buffer of information to be stored separately from the first buffer of information in a second area of address space of the memory. This allows the second buffer of information to be accessed at will without delay should the first buffer of information be required simultaneously.

In another embodiment of the invention, a first portion of a first buffer of information of an application can be allocated to a first memory channel so as to allow that first portion of the first buffer of information to be stored in the first area of address space of the memory. Then a second portion of the first buffer of information of the application can be allocated to a second memory channel so as to allow that second portion of the first buffer of information to be stored in a second area of address space of the memory. Finally, at least a portion of a second buffer of information of the application can be allocated to a second memory channel so as to allow that portion of the second buffer of information to be stored in the second area of address space of the memory.

These examples can be understood more readily through the following examples. A typical application of the embodiments of the invention might be a 3-D rendering engine, where memory is typically split into three main buffers: Local Buffer (LB), Texture Buffer (TB), and Frame Buffer (FB). The actual size and location of these three buffers might vary depending on the high-level application, it might be changed on the fly. An application might also require a frame buffer requester to access a region in the local buffer, or a frame buffer requester to render into the texture buffer. Normal operation of the rendering engine will typically utilize five distinctive types of accesses:

1. LBRD: read accesses to the local buffer
2. LBWR: write accesses to the local buffer
3. TXRD: read accesses to the texture buffer
4. FBRD: read accesses to the frame buffer
5. FBWR: write accesses to the frame buffer Another key point in applying the embodiments of the invention to a 3-D rendering engine is the typical characteristic of locality of such a system. Under most cases, accesses to a single buffer will be localized within a limited region. A typical example is the application of a texture, where a relatively small texture will be accessed for a long period of time while stretching the texture over a large polygon. Locality also refers to the fact that operations in the texture, local and frame buffers are usually completely independent.

The system considered here can contain two physical memory channels. Under normal operation, the high-level application might allocate the different buffers among the two memory channels such that the frame buffer resides in the lower channel, while the local and texture buffers share the upper channel. Depending on the amount of memory provided and the required size of the different buffers, at least the following three situations might arise:

1. The system provides a large amount of memory, and the required buffers are comparatively small.
2. The system requires large logical buffers with a relatively limited memory budget.
3. The system configuration has reasonable memory and buffers of average size. Under situation (1), the cost of memory would not be an issue and the system could be tuned for maximum performance. As such, the high-level application could map the local and texture buffers into the upper memory channel, while mapping the frame buffer alone in the lower channel. Using this configuration, and knowing that 3-D operations in the local/texture and frame buffers are independent, the system can take full advantage of the dual channel system. The local/texture requests may be served independently of the frame buffer requests, and a maximum performance can be attained. In this manner, the frame buffer can be accessed concurrently with a request to either the local or texture buffer. Note that even though logically mapped to different physical memory channels, each of the requestors can still access any region of the unified memory architecture system memory. Therefore, a unified memory architecture scheme is still fully supported. This can be especially important for offline downloading of texture data into memory. This might be accomplished by a frame buffer write block that is physically located in the texture buffer. This configuration would typically lead to a high cost but high performing 3-D rendering engine. An extreme implementation could make use of three different memory channels, thus reducing to null the overlap of requests between the texture, local and frame buffers. In this fashion all three buffers, each stored in an address space of a different memory channel, could be accessed concurrently. Therefore, no delay would be incurred when the local and texture buffers were required simultaneously.

Under situation (2), the cost of the memory could be minimal. The texture and local buffers may not, for example, fit within a single memory channel, and the high-level application would be required to make the choice of splitting the texture buffer across an address space of two memory channels. With this type of setup, and again, taking into consideration the principle of localization of memory accesses in a typical rendering engine, the two channels may be effectively used concurrently for a certain percentage of the requests. There will be, however, a certain amount of requests that will be accessing simultaneously the same channel. In this case, the arbiter will determine the winner and one of the requestors will be stalled. This will translate into a reduction of the effective memory bandwidth, and eventually into poorer performance of the rendering engine. This configuration provides a low cost, but a lower performing 3-D rendering engine. An extreme case could be defined when a single memory channel is implemented to serve all three buffers. In such a case, the three simultaneous requests, one each for the local, texture, and frame buffers, respectively, would lead to a delay while one buffer is accessed at a time.

Situation (3) represents an intermediate case between cases (1) and (2), where most of the requests would be served by different channels but might overlap over some periods of time.

As can be seen from this discussion, the embodiments of the invention provide full support for a unified memory architecture system with a small amount of additional logic while at the same time allowing simultaneous access to the memory by different requestors. The actual board level implementation, which is usually driven by performance and cost factors in a later stage of the design flow, can be tuned according to those requirements. This gives a much wider degree of freedom to a system designer and a greater versatility to a 3-D rendering engine. It allows on the fly memory allocation which can map the local, texture, and frame buffers to a memory according to the requirements of an application running on the system, e.g., resolution, level of detail, speed, etc. This is essentially for 3-D applications where the screen resolution (i.e., frame buffer size), level of details (texture buffer size) and supportive features (local buffer may be disabled) may vary during run time.

Finally, most current rendering engines will be heavily pipelined because of the volatile nature of graphics data. Latency is usually of little concern in a rendering engine, but throughput defines the real performance of the system. The architecture embodied by this invention can be completely pipelined without any difficulty and can fit most desirably in the design style and mode of operation of traditional 3-D rendering engines.

It is thought that the apparatuses and methods of the embodiments of the present invention and its attendant advantages can be understood from the foregoing description, and it will be apparent that various changes may be made in the form, construction, and arrangement of the parts thereof without departing from the spirit and scope of the invention or sacrificing its material advantages, the form hereinbefore described being merely a preferred or exemplary embodiment thereof.

What is claimed is:

1. A circuit for use in a Unified Memory Architecture system, the circuit comprising:

a memory of the Unified Memory Architecture system;

a plurality of requesting devices;

a plurality of channel selectors capable of receiving a command from at least one of said plurality of requesting devices for the Unified Memory Architecture system;

a first memory channel coupled to each of said channel selectors that can provide access to a first area of address space of the memory; and at least one additional memory channel coupled to each of said channel selectors, the or each additional memory channel being capable of providing access to a additional address space of said memory, each channel selector maintaining a channel identification tag that identifies the memory channel associated with the command;

an arbiter capable of passing said command to a memory controller with a selector-tag for use when said command is a read request to identify the channel selector that routed the command to the memory channel;

wherein said arbiter, memory controller and memory channel used to pass said command are responsible for and capable of transmitting data both to and from said memory; and wherein said arbiter is capable of using said selector tag when passing data obtained from said memory, and said channel selector is capable of using said channel identification tag to order data received from said memory.

2. The circuit as described in claim 1 wherein said arbiter prioritizes a plurality of commands intended for the first memory channel.

3. The circuit as described in claim 2 wherein the arbiter is capable of serializing the plurality of commands.

4. The circuit as described in claim 2 comprising a memory controller associated with the first memory channel.

5. The circuit as described in claim 4 comprising a memory-controller-buffer to store the selector-tag that identifies the channel selector that routed the command to the memory channel.

6. The circuit as described in claim 1 wherein each of the plurality of channel selectors is electrically coupled to a plurality of arbiters, each arbiter associated with a corresponding memory channel.

7. The circuit as described in claim 6 comprising a memory controller associated with the arbiter.

8. The circuit as described in claim 1 wherein at least one of said requestors comprises a computer and further comprising:

an application program executed by said computer wherein said application program is capable of allocating a first address space of the first memory channel so as to allow the first address space to act as a first buffer; and wherein said application program is capable of revising the allocation of the first address space so that at least a portion of the first buffer is re-allocated to one of the additional memory channels.

9. The circuit as described in claim 8 comprising:

a plurality of buffers of the application program allocated to a plurality of address spaces of said memory, each address space having a size; and a means for reallocating the plurality of buffers of the application program by redefining at least one of said buffers to have a different size.

10. The circuit for use in a Unified Memory Architecture system as described in claim 8 wherein the application program is adapted to allocate a first portion of the first buffer in the first memory channel and a second portion of the first buffer in a second memory channel.

11. The circuit for use in a Unified Memory Architecture system as described in claim 10 wherein the application program is adapted to allocate a portion of a second buffer of information of the application in the second memory channel.

12. A method of operating a Unified Memory Architecture system comprising:

providing a memory of the Unified Memory Architecture system;

providing a plurality of requesting devices;

providing a plurality of channel selectors capable of receiving a command from at least one of said plurality of requesting devices for the Unified Memory Architecture system;

providing a first memory channel coupled to each of said channel selectors to provide access to a first area of address space of the memory;

providing at least one additional memory channel coupled to each of said channel selectors, the or each additional memory channel capable of providing access to at least one additional area of address space of the memory, each channel selector maintaining a channel identification tag that identifies the memory channel associated with the command;

providing an arbiter capable of passing said command to a memory controller with a selector tag for use when said command is a read command to identify the channel selector that routed the command to the memory channel, wherein said arbiter is capable of using said selector tag when passing data obtained from said memory; and transmitting data to and from said memory by utilizing said arbiter, memory controller and memory channel that are used to pass said command, and using said channel identification tag to order data received from said memory.

13. The method of operating a Unified Memory Architecture system as described in claim 12 comprising:

utilizing an arbiter capable of prioritizing a plurality of commands intended for the first memory channel.

14. The method of operating a Unified Memory Architecture system as described in claim 13 comprising:

receiving a plurality of commands intended for the first memory channel; and utilizing the arbiter to serialize the plurality of commands.

15. The method of operating a Unified Memory Architecture system as described in claim 12 comprising:

utilizing a plurality of channel selectors to receive a plurality of commands directed to the Unified Memory Architecture system; and routing the plurality of received commands to memory channels requested by the plurality of received commands.

16. The method of operating a Unified Memory Architecture system as described in claim 15 and further comprising utilizing arbiters associated with the memory channels.

17. The method of operating a Unified Memory Architecture system, as described in claim 12 wherein at least one of said requesters comprises a computer comprising:

executing an application program with said computer;

allocating a first buffer to a first address space; and revising the allocation of the first buffer so that at least a portion of the first buffer is re-allocated to one of the additional memory channels.

18. The method of operating a Unified Memory Architecture system as described in claim 17 comprising:

allocating a second buffer to a second address space;

reallocating the first buffer and the second buffer during run time of the application.

19. The method of operating a Unified Memory Architecture system as described in claim 18 comprising:

utilizing the first memory channel to access the first area of address space of the memory while concurrently utilizing the at least one additional memory channel to access the at least one additional area of address space of the memory.

20. The method of operating a Unified Memory Architecture system as described in claim 17 comprising:

allocating a first buffer to a first address space;

allocating a second buffer to a second address space so as to allow the second buffer to be stored separately from the first buffer in said second address space of the memory.

21. The method of operating a Unified Memory Architecture system as described in claim 17 comprising:

allocating a first portion of a first buffer to be stored in a first address space of the memory; and allocating a second portion of the first buffer of information to be stored in a second area of address space of the memory.

22. The method of operating a Unified Memory Architecture system as described in claim 21 comprising allocating at least a portion of a second buffer of information of the application so as to allow the portion of the second buffer of information to be stored in the second area of address space of the memory.

23. A method of processing a memory request in a unified memory architecture system, the method comprising:

receiving at a channel selector the request from a requester device;

identifying one of a plurality of memory channels associated with the request, and storing at the channel selector a channel identification tag that identifies the identified memory channel;

communicating the request to an arbiter associated with the identified memory channel, the arbiter associating with the request a selector tag to identify the channel selector from which the request was communicated; and receiving at the channel selector data from the memory channel and ordering data received from the plurality of memory channels dependent upon the channel identification tag.

24. The method of claim 23 which comprises:

receiving a plurality of requests at any one of a plurality of channel selectors, each request being issued a channel identification tag;

monitoring the channel identification tag of the data received from each one of the plurality of memory channels; and communicating data to an associated requester device in a sequence in which the tags were issued.

25. The method of claim 24 wherein each channel selector is responsible for issuing identification tags to requests that it receives.

26. The method of claim 23 wherein the channel identification tags are fed into a first-in-first-out (FIFO) buffer and the data from the plurality of memory channels is communicated to the associated requester device based on the sequence in which the tags exit the buffer.

27. A circuit to process a memory request in a unified memory architecture system, the circuit comprising:

a channel selector to receive the request from a requestor device, wherein the channel identifies one of a plurality of memory channels associated with the request, and stores a channel identification tag that identifies the identified memory channel; and an arbiter to receive the request, the arbiter being associated with the identified memory channel and associating with the request a selector tag to identify the channel selector from which the request was communicated, and wherein the channel selector receives data from the memory channel and orders data received from the plurality of memory channels dependent upon the channel identification tag.

28. The circuit of claim 27 wherein each channel selector is responsible for issuing identification tags to requests that it receives.

29. The circuit of claim 27 wherein a plurality of requests are receivable at any one of a plurality of channel selectors, each request being issued a channel identification tag and the each channel selector monitors the channel identification tag of the data received from each one of the plurality of memory channels and communicates data to an associated requestor device in a sequence in which the tags were issued.

30. The circuit of claim 27 which includes a first-in-first-out (FIFO) buffer into which the channel identification tags are fed, the data from the plurality of memory channels being communicated to the associated requestor device based on the sequence in which the channel identification tags exit the buffer.

* * * * *